(12) United States Patent
Hall et al.

(10) Patent No.: US 7,575,425 B2
(45) Date of Patent: Aug. 18, 2009

(54) ASSEMBLY FOR HPHT PROCESSING

(76) Inventors: David R. Hall, 2185 S. Larsen Pkwy., Provo, UT (US) 84606; Ronald Crockett, 2185 S. Larsen Pkwy., Provo, UT (US) 84606; Jacob S. Waldron, 2185 S. Larsen Pkwy., Provo, UT (US) 84606; Joe Fox, 2185 S. Larsen Pkwy., Provo, UT (US) 84606

( * ) Notice: Subject to any disclaimer, the term of this patent is extended or adjusted under 35 U.S.C. 154(b) by 468 days.

(21) Appl. No.: 11/469,229

(22) Filed: Aug. 31, 2006

(65) Prior Publication Data

US 2008/0057145 A1   Mar. 6, 2008

(51) Int. Cl.
*B29C 43/02*   (2006.01)
*B28B 3/00*   (2006.01)

(52) U.S. Cl. .................................. 425/78; 425/405.2

(58) Field of Classification Search .................. 425/77, 425/78, 405.1–405.2
See application file for complete search history.

(56) References Cited

U.S. PATENT DOCUMENTS

| | | | |
|---|---|---|---|
| 4,034,066 A * | 7/1977 | Strong et al. | ................... 425/77 |
| 4,333,902 A | 6/1982 | Hara | |
| 4,333,986 A | 6/1982 | Tsuji | |
| 4,412,980 A | 11/1983 | Tsuji | |
| 4,425,315 A | 1/1984 | Tsuji | |
| 6,596,225 B1 | 7/2003 | Pope | |
| 2005/0044800 A1 | 3/2005 | Hall | |

* cited by examiner

*Primary Examiner*—Yogendra Gupta
*Assistant Examiner*—Thu Khanh T Nguyen
(74) *Attorney, Agent, or Firm*—Tyson J. Wilde (57) ABSTRACT

An improved assembly for HPHT processing having a can with an opening and a mixture disposed within the opening. A sealant barrier is positioned atop the mixture. First and second lids are positioned atop the mixture. A meltable sealant positioned intermediate the second lid and a cap covering the opening.

12 Claims, 9 Drawing Sheets

```
┌─────────────────────────────────────────────────────────────────┐
│ Providing an assembly comprising a can with an opening and a    │
│ mixture disposed within the opening, a sealant barrier          │
│ positioned atop the mixture, a first and second lid positioned  │
│ atop the mixture, a meltable sealant positioned intermediate    │
│ the second lid and a cap covering the opening                   │
│                                                             901 │
└─────────────────────────────────────────────────────────────────┘
                                │
┌─────────────────────────────────────────────────────────────────┐
│ Heating the assembly to a cleansing temperature for a first     │
│ period of time                                                  │
│                                                             902 │
└─────────────────────────────────────────────────────────────────┘
                                │
┌─────────────────────────────────────────────────────────────────┐
│ Further heating 903 the assembly to a sealing temperature for a │
│ second period of time                                           │
│                                                             903 │
└─────────────────────────────────────────────────────────────────┘
```

Fig. 9

ASSEMBLY FOR HPHT PROCESSING

BACKGROUND OF THE INVENTION

This invention relates to superhard products such as diamond, polycrystalline diamond, and cubic boron nitride produced by the high pressure and high temperature (HPHT) method. More particularly this invention relates to the HPHT containers or can assemblies in which the superhard materials are processed. Superhard materials by the HPHT method are produced by encapsulating the materials into a container, variously known in the art as a container, a can, an enclosure, a cup, a shield, and a tube.

U.S. Pat. No. 4,333,902 which is herein incorporated by reference for all that it contains, discloses a process of producing a sintered compact comprises filling a cup with a powdered material to be sintered, putting on an opening of the cup a covering member consisting of a lid and solder so as to permit ventilation between the interior and exterior of the cup to form a cup assembly, applying heat as well as vacuum to the cup assembly to degas the powdered material, melting the solder by the continuation of heat to air-tightly seal the cup with the lid to obtain a closed cup compressible under high pressure at high temperature while maintaining the air-tight seal, and hot-pressing the closed cup to obtain a sintered compact. The covering member may include a porous lid closing the cup and a solder put on the porous lid.

U.S. Pat. No. 4,425,315 which is herein incorporated by reference for all that it contains, discloses a diamond sintered compact wherein diamond crystal particles are uniformly orientated in a particular direction and the method for producing the same, and has for an object to provide a diamond sintered compact having a high thermal conductivity particularly suitable for heat sink for use in the field of electronics. According to the invention, graphite is used as carbonaceous raw material, diamond crystal particles having such elongated shape that the ratio of the length of the long axis to that of the short axis is more than 2 being synthesized in such state that the greater part of the crystal particles have their long axes uniformly oriented in a particular direction, the crystal particles being sintered in the direction of the long axes thereof so that transformation of the graphite into diamond and sintering thereof may be accomplished synchronously. The invention has for an object to obtain a diamond sintered compact suitable for the aforesaid use by degassing reaction system raw material plugged into an air permeable container by heating it in vacuum in order to intercept gaseous components causing a decrease of thermal conductivity at the time of synthesizing diamond from carbonaceous material and a catalytic metal and sintering thereof, subsequently the air permeable part of the said container being sealed by means of soldering material preliminarily placed in contact with the said container.

U.S. Pat. No. 4,425,315 which is herein incorporated by reference for all that it contains, discloses a diamond sintered compact suitable for the aforesaid use by degassing reaction system raw material plugged into an air permeable container by heating it in vacuum in order to intercept gaseous components causing a decrease of thermal conductivity at the time of synthesizing diamond from carbonaceous material and a catalytic metal and sintering thereof, subsequently the air permeable part of the said container being sealed by means of soldering material preliminarily placed in contact with the said container.

U.S. Pat. No. 6,596,225 to Pope et al. which is herein incorporated by reference for all that it contains, discloses sealing of the can by electron beam welding at high temperature and in a vacuum.

U.S. Patent Publication 2005/0044800 A1 which is herein incorporated by reference for all that it contains, discloses an assembly for High-Pressure High-Temperature (HPHT) processing comprising a can, a cap, a meltable sealant and sealant barrier, and a superhard mixture comprising superhard particles. The superhard particles may be positioned adjacent a substrate of cemented metal carbide. The can and cap contain the superhard mixture with the sealant barrier positioned within the assembly so as to be intermediate the sealant and at least a portion of the mixture, thereby preventing the sealant from coming in contact with the mixture during processing. The assembly is placed within a vacuum chamber and heated to a temperature sufficient to cleanse the assembly and then melt the sealant providing a hermetic seal for the assembly in preparation for further HPHT processing.

BRIEF SUMMARY OF THE INVENTION

In one aspect of the present invention, an improved assembly for HPHT processing has a can with an opening and a mixture disposed within the opening. A sealant barrier may be positioned atop the mixture as well as a first and second lid. A meltable sealant may be positioned intermediate the second lid and a cap covering the opening. The second lid may be at least partially formed of a material selected from the group consisting of a metal or metal alloy. The first lid and can may comprise a niobium, niobium alloy, niobium mixture, or combinations thereof. The first lid and can may further have a metal or metal alloy portion.

The mixture may have a composite body with a substrate lying adjacent a plurality of superhard particles. The superhard particles may be selected from the group consisting of diamond, polycrystalline diamond, thermally stable products, polycrystalline diamond depleted of its catalyst, polycrystalline diamond having nonmetallic catalyst, cubic boron nitride, cubic boron nitride depleted of its catalyst, and combinations thereof. The sealant barrier may be partially formed of a material selected from the group consisting of a stop off compound, a solder/braze stop, a mask, a tape, a plate, and sealant flow control, or a combination thereof. The sealant may further be bonded to the cap, the first or second lid, the can, or a combination thereof. At a temperature greater than the temperature required to at least partially cleanse the assembly the sealant may begin to flow and melt. The sealant may have copper, a material selected from the group consisting of copper, nickel, cobalt, gold, silver, manganese, palladium, titanium, niobium, zinc, phosphorus, boron, aluminum, cadmium, chromium, tin, silicon, tantalum, alloys, compounds mixtures, and combinations thereof having a melting point, or melting range, at least partially higher than the temperature required to cleanse the assembly. The meltable sealant may further have a melting temperature of 1000° C. to 2000° C.

A method of HPHT processing, using the steps of providing an assembly with a can having an opening and a mixture disposed within the opening, a sealant barrier positioned atop the mixture, a first and second lid positioned atop the mixture, a meltable sealant positioned intermediate the second lid and a cap covering the opening; heating the assembly to a cleansing temperature for a first period of time; further heating the assembly to a sealing temperature for a second period of time. The assembly may be heated in a vacuum. The assembly may further be heated in an inert gas and brought back to atmospheric pressure at a temperature sufficient to melt the sealant.

The cleansing temperature may be between 800° C. and 1050° C. The sealing temperature may be between 1000° C. and 1200° C. The first period of time may be between 15 minutes and 60 minutes and the second period of time may be between 2 minutes and 25 minutes.

DETAILED DESCRIPTION OF THE INVENTION AND THE PREFERRED EMBODIMENT

Figure 1:
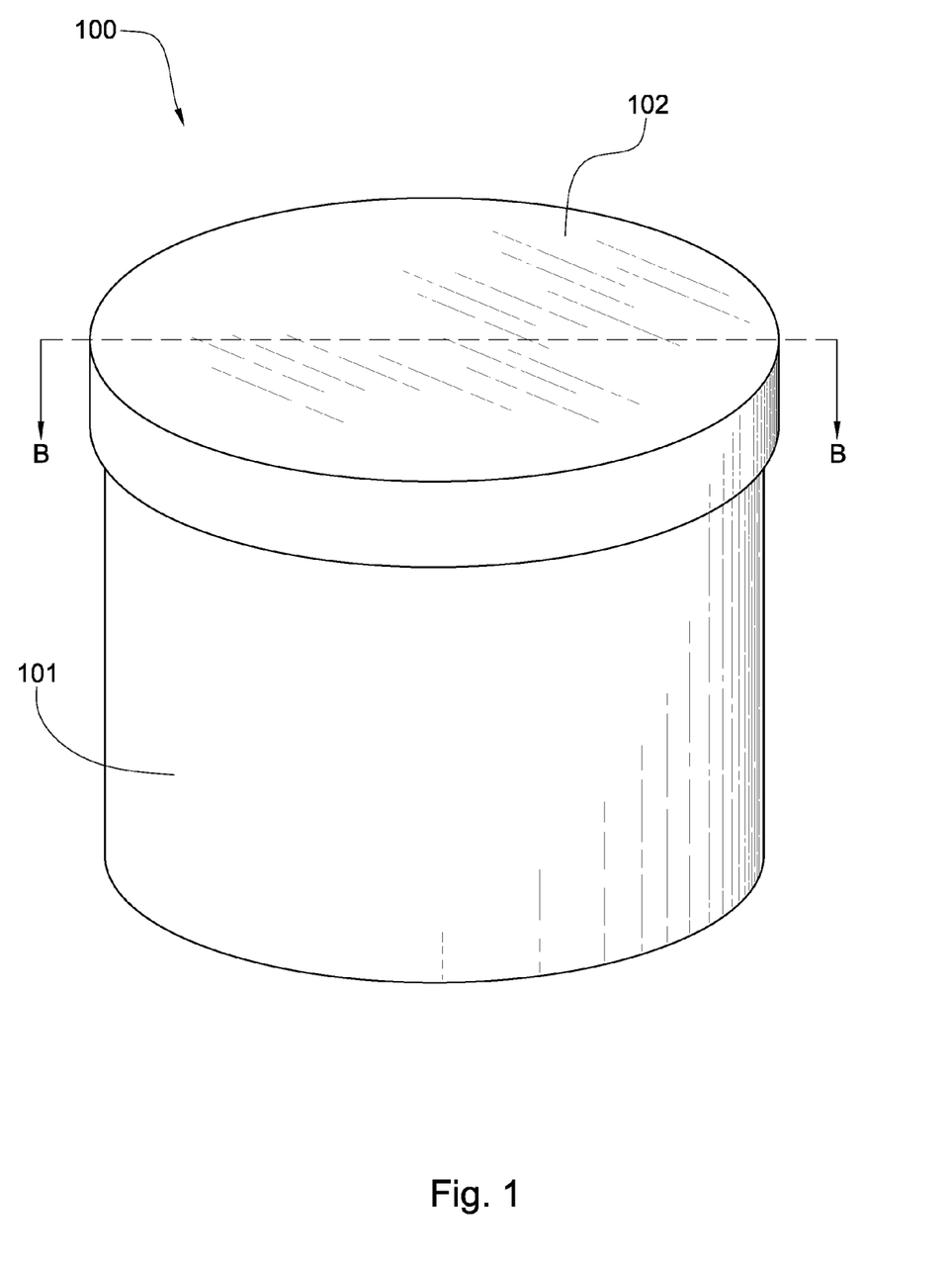
FIG. 1 is a perspective diagram of an embodiment for an HPHT processing assembly.

Referring now to the figures, FIG. 1 is a perspective diagram of an embodiment for a high pressure high temperature (HPHT) processing assembly 100 comprising a can 101 with a cap 102. At least a portion of the can 101 may comprise niobium, a niobium alloy, a niobium mixture, or combinations thereof. At least a portion of the cap 102 may comprise a metal or metal alloy. Line BB describes the plane of the cross section of the subsequent figures.

A can such as the can of FIG. 1 may be placed in a cube adapted to be placed in a chamber of a high temperature high pressure apparatus. Prior to placement in a high temperature high pressure chamber the assembly may be placed in a heated vacuum chamber to remove the impurities from the assembly and seal the assembly. After the assembly has been sealed it may be undergo HPHT processing.

Figure 2:
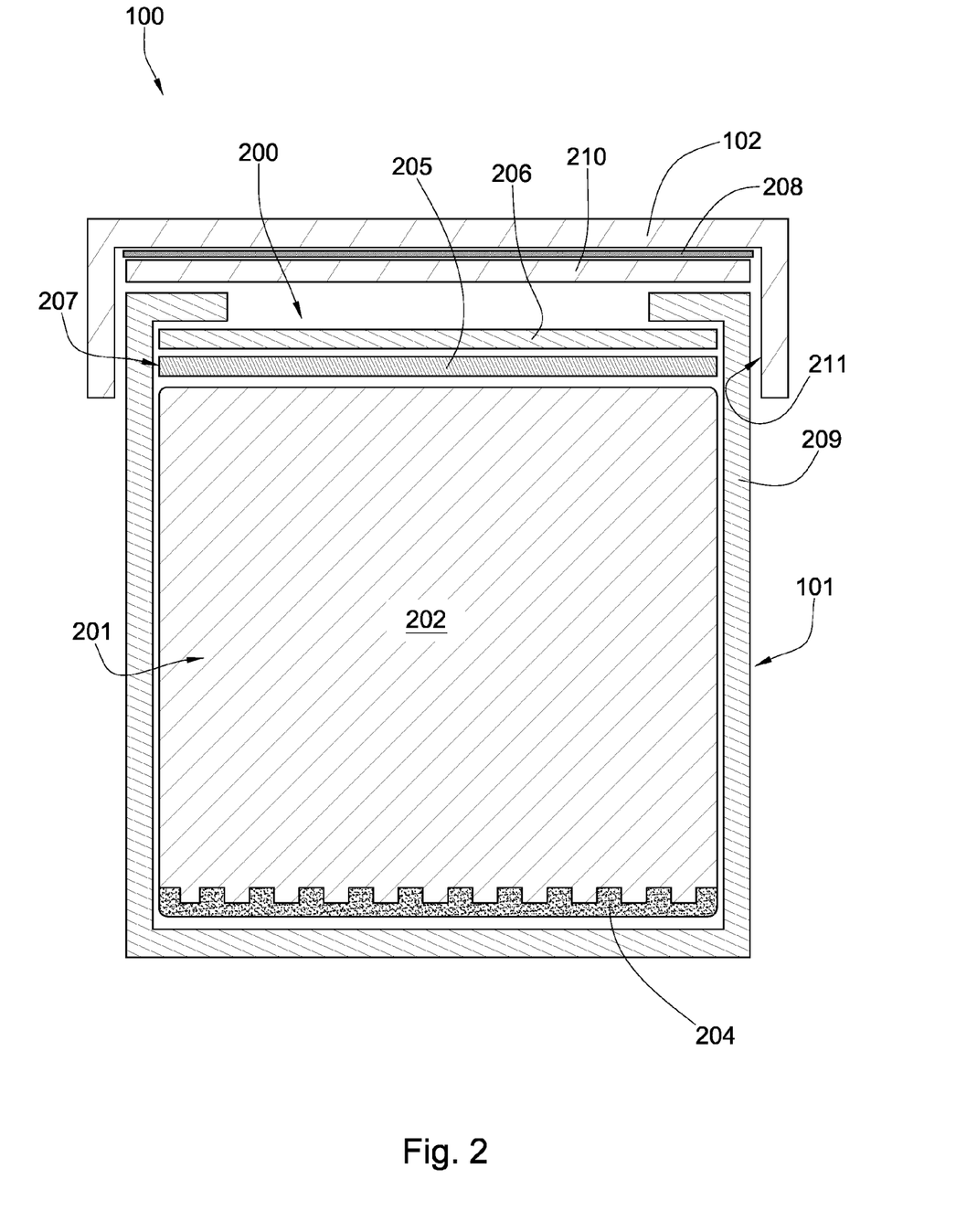
FIG. 2 is a cross-sectional diagram of another embodiment of an assembly for HPHT processing.

FIG. 2 is a cross-sectional diagram of an embodiment of an assembly 100 for HPHT processing. The assembly 100 comprises a can 101 with an opening 200 and a mixture 201 disposed therein. The mixture 201 may comprise a substrate 202 lying adjacent a plurality of superhard particles 204. The superhard particles 204 may be selected from the group consisting of diamond, polycrystalline diamond, thermally stable products, polycrystalline diamond depleted of its catalyst, polycrystalline diamond having nonmetallic catalyst, cubic boron nitride, cubic boron nitride depleted of its catalyst, and combinations thereof The substrate may comprise a hard metal such as carbide, tungstencarbide, or other cemented metal carbides. Preferably, the substrate 202 comprises a hardness of at least 58 HRc. Other possible materials may include hardened steel, hard facing, cubic boron nitride, and other ceramics and/or composites.

A sealant barrier 205 may be placed within the opening 200 of the can 101 in-between the mixture 201 and a first lid 206. The sealant barrier 205 may comprise a material selected from the group consisting of a stop off compound, a solder/braze stop, a mask, a tape, a plate, and sealant flow control, or a combination thereof. In one embodiment the sealant barrier 205 may comprise a disk of material that corresponds with the opening of the can 101. A gap 207 between 0.005 to 0.050 inches may exist between the sealant barrier 205 and the can 101. The gap 207 may support the outflow of contamination while being small enough size to prevent the flow of a sealant 208 into the mixture 201. Various alterations of the current configuration may include but should not be limited to; applying a sealant barrier 205 to the first lid 206 or can by coating, etching, brushing, dipping, spraying, silk screening painting, plating, baking, and chemical or physical vapor deposition techniques. The sealant barrier 205 may in one embodiment be placed on any part of the assembly 100 where it may be desirable to inhibit the flow of the liquefied sealant 208.

The first lid 206 may comprise niobium or a niobium alloy to provide a substrate that allows good capillary movement of the sealant 208. After the first lid 206 the walls 209 of the can 101 may be folded over the first lid 206. A second lid 210 may then be placed on top of the folded walls 209. The second lid 210 may comprise a material selected from the group consisting of a metal or metal alloy. The metal may provide a better boding surface for the sealant 208 and allow for a strong bond between the lids 206, 210, can 101 and a cap 102. Following the second lid 210 a metal or metal alloy cap 102 may be place on the can 101. In one embodiment the cap 211 may comprise a smooth surface finish 211 to provide a better bonding surface for the sealant 208.

Figure 3:
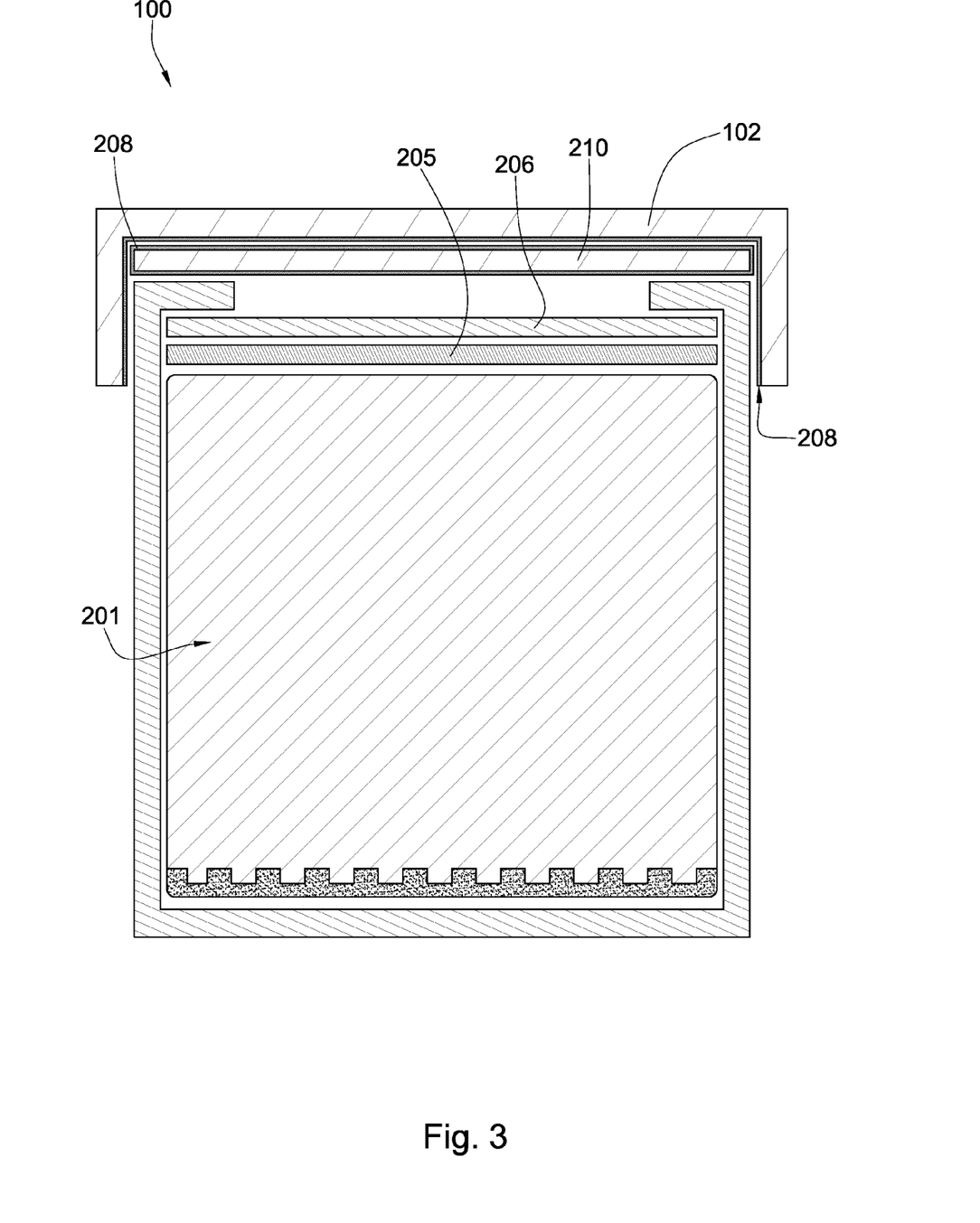
FIG. 3 is a cross-sectional diagram of another embodiment of an assembly for HPHT processing.

FIG. 3 is a cross-sectional diagram of an embodiment of an assembly 100 for HPHT processing. In the present embodiment the sealant 208 may be bonded to the cap 102 and/or second lid 210. This may be done by copper plating or spraying a copper coat onto the lid 210 and/or cap 102. Once assembled the assembly 100 may be placed within a high temperature furnace (not shown). A vacuum may be applied to the furnace to help remove the contaminants from within the furnace as well as the assembly 100. The assembly 100 may then be heated to a cleansing temperature between 800° C. and 1050° C. for 15 minutes to 60 minutes. This may allow the assembly 100 to be cleansed of impurities in preparation for the HPHT processing. Alternate methods may include simultaneously heating and creating a vacuum within the furnace or heating the furnace and then applying a vacuum. The assembly may then be heated to a sealing temperature of between 1000° C. and 1200° C. for 2 minutes to 25 minutes. During this 2 to 25 minutes or second period of time the sealant 208 may melt and flow through out the assembly 100 except beyond the sealant barrier 205 into the mixture 201. Preferably the sealant 208 melts and flows at a temperature greater than or equal to the cleansing temperature. The assembly 100 may then be allowed to cool within the vacuum furnace until the sealant 208 has at least partially solidified. The assembly 100 may then be removed from the furnace and may be ready for HPHT processing.

Figure 4:
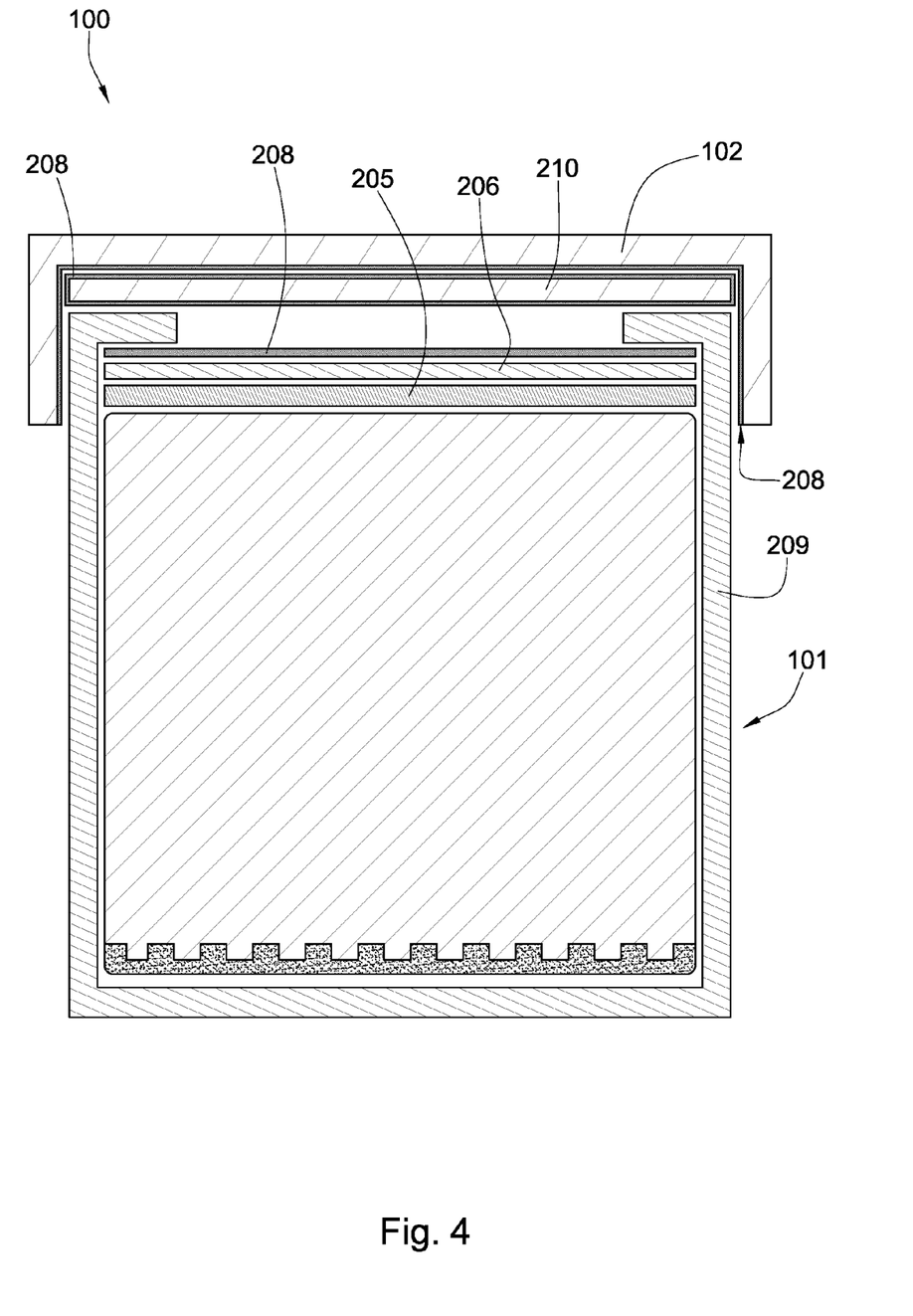
FIG. 4 is a cross-sectional diagram of another embodiment of an assembly for HPHT processing.

FIG. 4 is a similar configuration to FIG. 3 with an added component. In addition to the sealant 208 bonded to the can 101 and/or second lid 210, a portion of sealant 208 may be placed on top of the first lid 206 prior to the folding over of the can walls 209. This configuration may allow a double seal to be created. A first seal may take place between the cap 102 and the can 101 due to the sealant 208 bonded to the cap 102. A second seal may occur around the first lid 206 and can 101 from the portion of sealant 208 placed in-between the first lid 206 and the folded over can walls 209. One or both seals combined may be used to create a hermetically sealed assembly 100.

Figure 5:
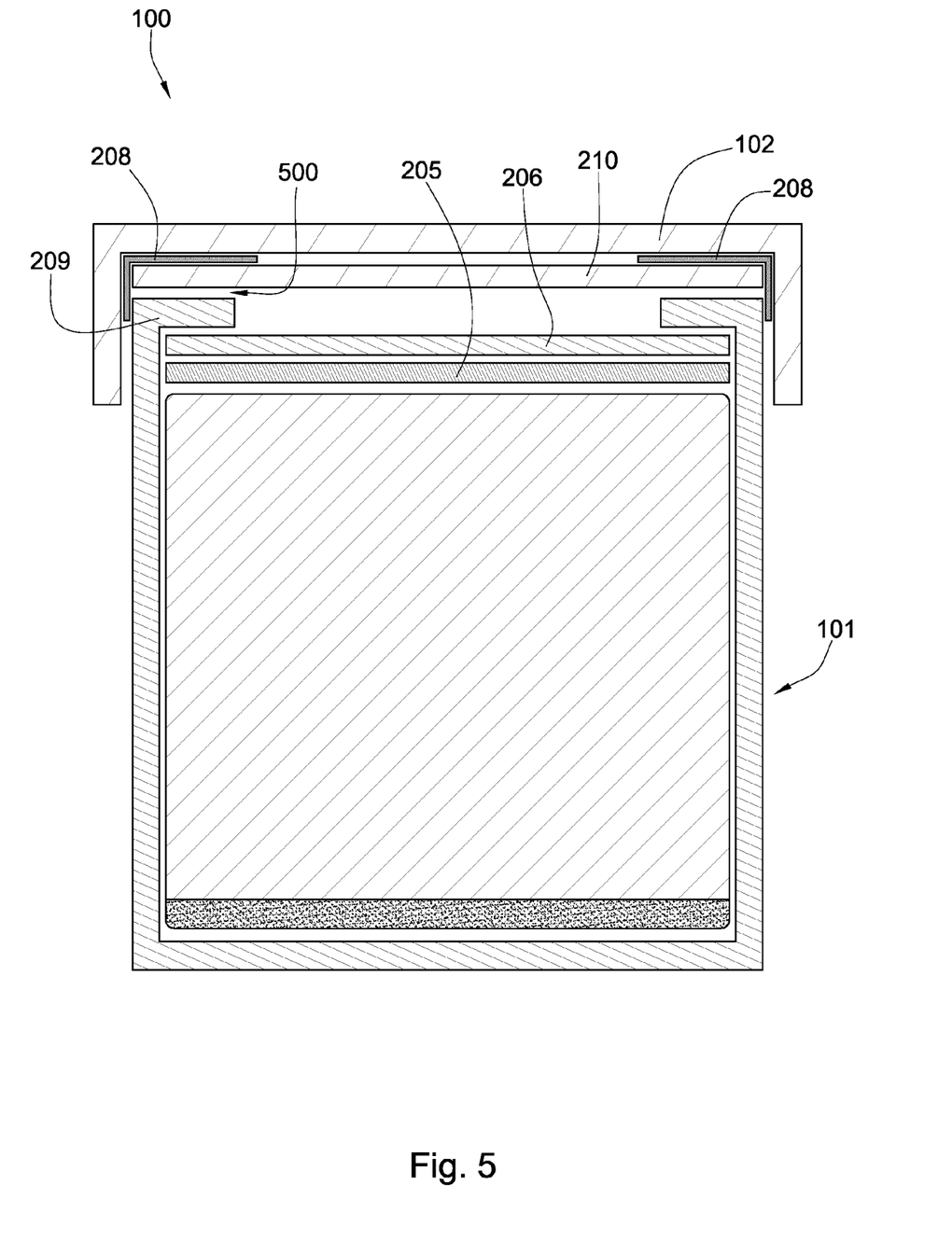
FIG. 5 is a cross-sectional diagram of another embodiment of an assembly for HPHT processing.

FIG. 5 is a cross-sectional diagram of an embodiment of an assembly 100 for HPHT processing. In the current embodiment the meltable sealant 208 may be placed around the circumference of the second lid 210 and extend down beyond the top of the can 101. The sealant 208 may extend down to the ends of the cap 102 or just past the interface 500 of the second lid 210 and the folded can walls 209. The meltable sealant 208 may be formed of a copper based paste; a sheet of copper, a copper plate, a copper ring, a copper sleeve, or combinations thereof. The sealant 208 may be pre-formed to correspond with the curves of the can 101, cap 102 and lids 206, 210 or the sealant 208 may be bent around the curves when placed on the assembly 100.

Figure 6:
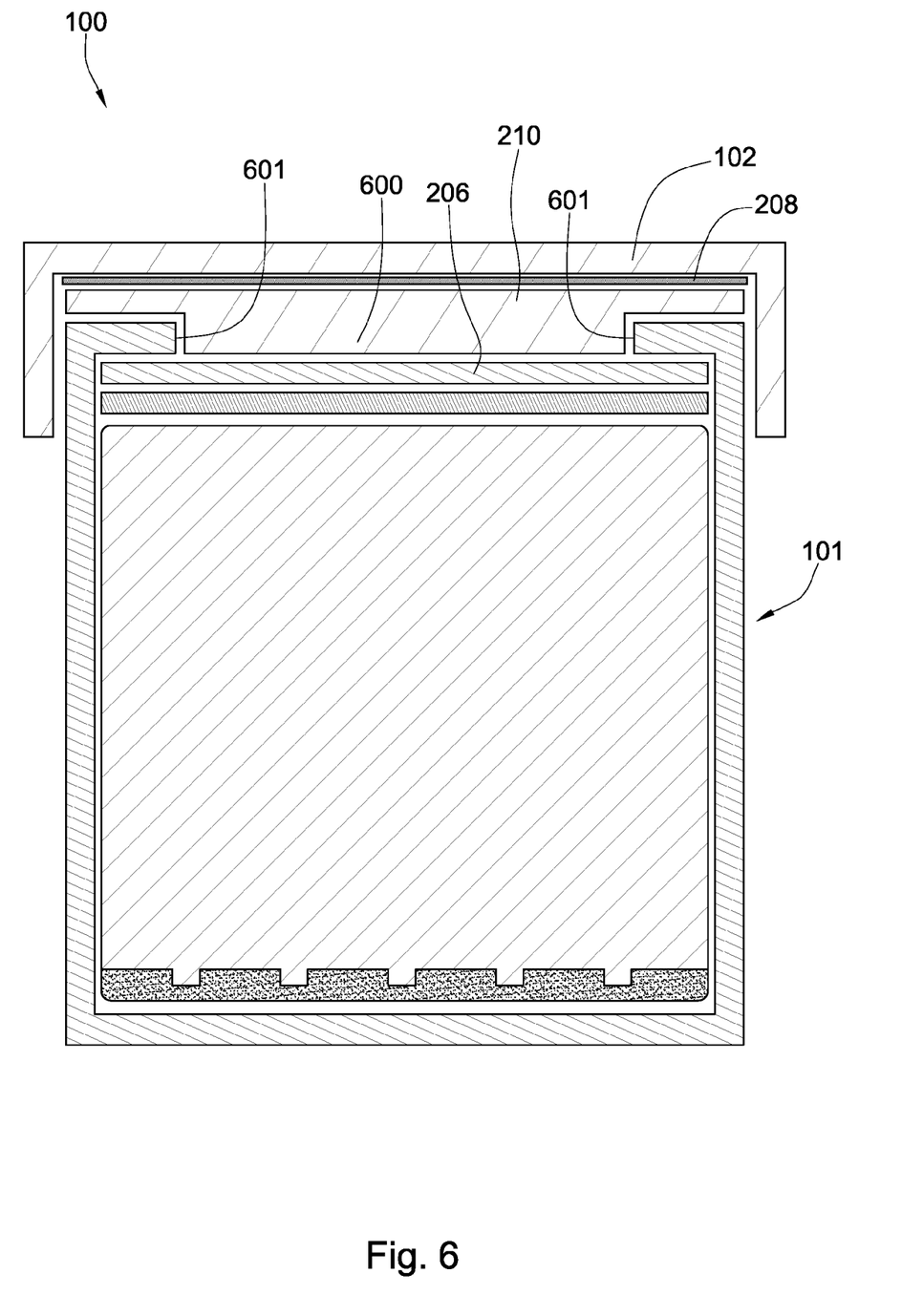
FIG. 6 is a cross-sectional diagram of another embodiment of an assembly for HPHT processing.

FIG. 6 is a cross-sectional diagram of an embodiment of an assembly 100 for HPHT processing. In the present embodiment the second lid 210 comprises an extension 600 to fill the space between the folded can walls 209. The extension 600 may decrease the volume through which the meltable sealant 208 may fill and provide more surface area for the sealant 208 to bond with. In one embodiment the sealant 208 may create a bond between the extension 600 and the first lid 206 as well as the extension 600 and the ends 601 of the folded can wall 209. The extension 600 may also reduce the amount of required sealant 208 by filling the large voids with other material that may have otherwise been filled with sealant 208.

Figure 7:
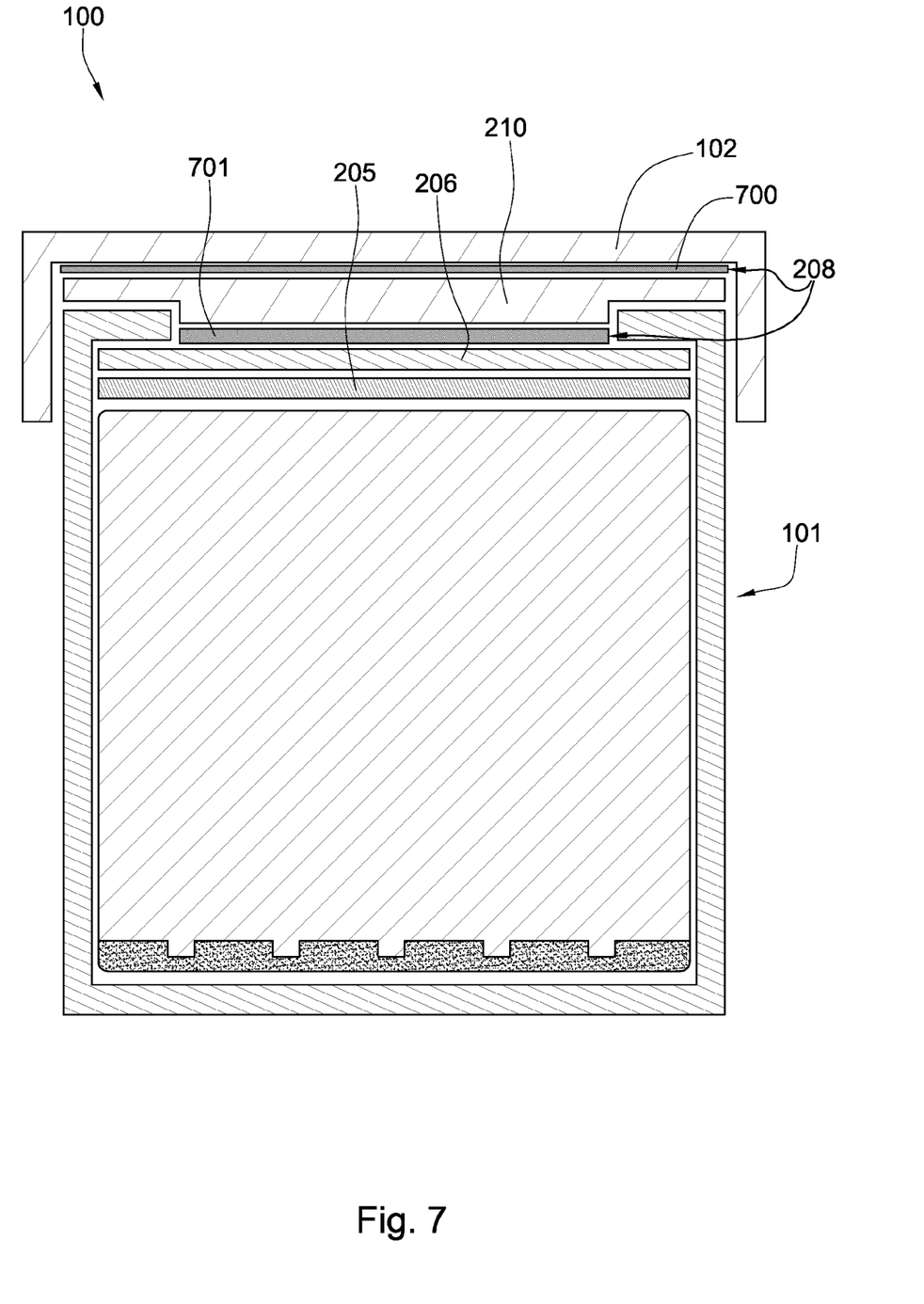
FIG. 7 is a cross-sectional diagram of another embodiment of an assembly for HPHT processing.

FIG. 7 is a cross-sectional diagram of an embodiment of an assembly 100 for HPHT processing. The assembly 100 comprises a sealant 208 with a first and a second sealing element 700, 701. The first sealing element 700 may be placed in-between the cap 102 and the second lid 210 and generate a seal between the cap 102, can 101 and lid 206. The second sealing element 701 may be placed between the first lid 206 and the second lid 210 and generate a seal between the can 101, first lid 206 and second lid 210. With multiple sealing elements 700, 701 a greater seal may be achieved in a shorter period of time. Other configurations with two or more sealing elements 700, 701 may also be used.

Figure 8:
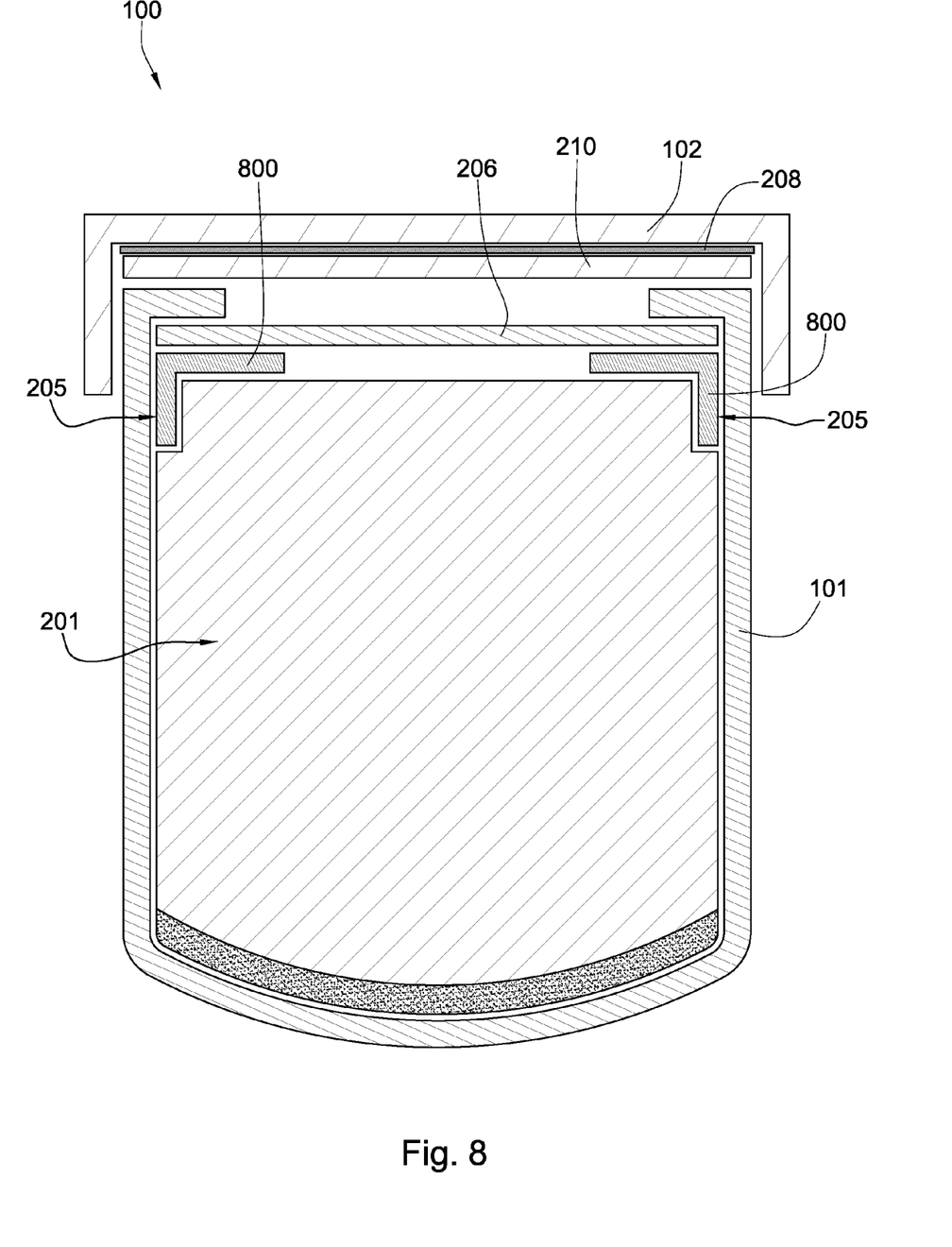
FIG. 8 is a cross-sectional diagram of another embodiment of an assembly for HPHT processing.

FIG. 8 is a cross-sectional diagram of an embodiment of an assembly 100 for HPHT processing. The assembly 100 comprises a sealant barrier 208 comprising a sleeve 800 that may rap around the mixture 201 in-between the mixture 201 and the inside of the can 101. In one embodiment the sleeve 800 may be folded over in-between the mixture 201 and the first lid 206. The sleeve 800 may be formed from a malleable material comprising refractory material with inert oxides such as; graphite, silica, magnesia, yttria, boron nitride, or alumina. In one embodiment the oxides may be applied by coating, etching, brushing, dipping, spraying, silk screen painting, plating, baking, and chemical or physical vapor deposition techniques. Alternately a paste or spray may be applied around the circumference of the mixture or be applied around the inside of the can 101.

Figure 9:
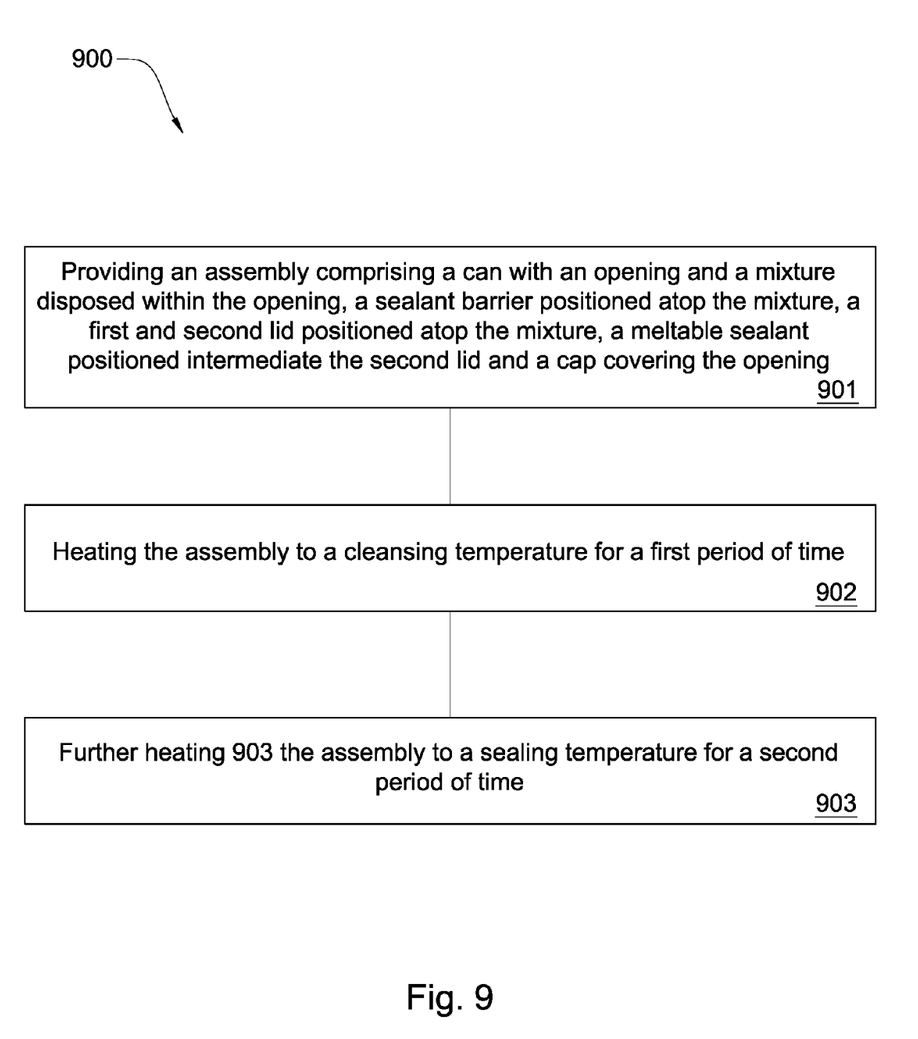
FIG. 9 is a method of an embodiment for preparing an assembly for HPHT processing.

FIG. 9 is a method 900 of an embodiment for preparing an assembly for HPHT processing includes the steps of providing 901 an assembly comprising a can with an opening and a mixture disposed within the opening, a sealant barrier positioned atop the mixture, a first and second lid positioned atop the mixture, a meltable sealant positioned intermediate the second lid and a cap covering the opening; heating 902 the assembly to a cleansing temperature for a first period of time; further heating 903 the assembly to a sealing temperature for a second period of time. In one embodiment the assembly may be heated to the cleansing temperature in a vacuum and then brought back to atmospheric pressure in an inert gas. The assembly may then be brought to; the sealing temperature while in an inert gas. This may create a more stable assembly because the internal pressure of the assembly may be the same as the pressure outside of the assembly. This type of assembly may also be less prone to leaks and contamination during HPHT processing and transportation to the processing site.

Whereas the present invention has been described in particular relation to the drawings attached hereto, it should be understood that other and further modifications apart from those shown or suggested herein, may be made within the scope and spirit of the present invention.

What is claimed is:

1. An assembly for HPHT processing, comprising:
   a can comprising an opening and a mixture disposed within the opening;
   a substrate adjacent and above the mixture;
   a sealant barrier positioned atop the substrate;
   a first lid positioned atop the substrate and beneath an end of a folded can wall;
   a second lid positioned above the folded can wall; and
   a meltable sealant positioned intermediate the second lid and a cap covering the opening.

2. The assembly of claim 1, wherein the second lid comprises a material selected from the group of a metal or metal alloy.

3. The assembly of claim 1, wherein the first lid and can comprise niobium, niobium alloy, niobium mixture, or combinations thereof.

4. The assembly of claim 1, wherein the mixture comprises a composite body comprising a substrate lying adjacent a plurality of superhard particles.

5. The assembly of claim 4, wherein the superhard particles are selected from the group consisting of diamond, polycrystalline diamond, thermally stable products, polycrystalline diamond depleted of its catalyst, polycrystalline diamond having nonmetallic catalyst, cubic boron nitride, cubic boron nitride depleted of its catalyst, and combinations thereof.

6. The assembly of claim 1, wherein the sealant barrier comprises a material selected from the group consisting of a stop off compound, a solder/braze stop, a mask, a tape, a plate, and sealant flow control, or a combination thereof.

7. The assembly of claim 1, wherein the sealant is bonded to the cap, the first or second lid, the can, or a combination thereof.

8. The assembly of claim 1, wherein the sealant begins to flow at a temperature at least equal to or greater than the temperature required to at least partially cleanse the assembly.

9. The assembly of claim 1, wherein the sealant at least partially melts at a temperature about equal to or greater that the temperature required to at least partially cleanse the assembly.

10. The assembly of claim 1, wherein the sealant comprises a material selected from the group consisting of copper, nickel, cobalt, gold, silver, manganese, palladium, titanium, niobium, zinc, phosphorus, boron, aluminum, cadmium, chromium, tin, silicon, tantalum, alloys, compounds mixtures, and combinations thereof having a melting point, or melting range, at least partially higher than the temperature required to cleanse the assembly.

11. The assembly of claim 1, wherein the meltable sealant comprises a melting temperature of 1000° C. to 2000° C.

12. The assembly of claim 1, wherein the can and or first lid comprise a metal or metal alloy portion.

* * * * *